United States Patent [19]

Reiss, Jr.

[11] 4,374,091
[45] Feb. 15, 1983

[54] GAS GENERATORS HAVING CONTROLLED OPERATIONAL ATTITUDES

[75] Inventor: Edward H. Reiss, Jr., Little Silver, N.J.

[73] Assignee: The United States of America as represented by the Secretary of the Army, Washington, D.C.

[21] Appl. No.: 293,415

[22] Filed: Aug. 14, 1981

[51] Int. Cl.³ .......................... G05D 7/00; B01J 7/00; B01J 4/00
[52] U.S. Cl. .................... 422/114; 422/106; 422/107; 422/112; 422/122; 422/160; 422/211; 422/236
[58] Field of Search ............... 422/114, 115, 112, 105, 422/106, 160, 122, 236, 238, 211, 107

[56] References Cited

U.S. PATENT DOCUMENTS

| | | | |
|---|---|---|---|
| 3,174,833 | 3/1965 | Blackmer | 422/112 X |
| 3,453,086 | 7/1969 | Harm | 422/112 |
| 3,554,707 | 1/1971 | Holmes et al. | 422/105 |
| 3,556,205 | 1/1971 | Harwood | 422/114 X |
| 3,787,186 | 1/1974 | Geres | 422/111 |
| 3,820,956 | 6/1974 | Tutterington | 422/238 X |
| 4,332,775 | 6/1982 | Genequand et al. | 422/112 |

FOREIGN PATENT DOCUMENTS 150494  9/1968  U.S.S.R. ............................. 422/105

Primary Examiner—Barry S. Richman
Attorney, Agent, or Firm—Nathan Edelberg; Jeremiah G. Murray; John W. Redman

[57] ABSTRACT

Positional sensitivity of a Kipp type generator with respect to a gravitational field is achieved by utilization of one or more selectively oriented gravitational sensitive valves in the chamber containing the liquid capable of providing the desired gaseous output. The gravitational sensitive valves may be used individually or in combination. Each valve permits operation when it has an orientation corresponding to a predetermined orientational range. A chamber whose geometrical shape is a parallelepiped employs an arrangement of four gravitational sensitive valves to provide gas generator operation independent of its orientation in a gravitational field.

6 Claims, 3 Drawing Figures

GAS GENERATORS HAVING CONTROLLED OPERATIONAL ATTITUDES

TECHNICAL FIELD

This invention relates to sources of gas production. More particularly, this invention relates to improved gas generators of the portable type suitable for supplying gas in fuel cells.

BACKGROUND OF THE INVENTION

The advantages of the Kipp generator type fuel system as providing fuel economy and practability are fairly well known for low power requirements. Typically, they provide one of the gases consumed by fuel cells in the generation of electrical power. The Kipp generator type fuel systems which are known suffer from the drawback of being positionally sensitive since certain of their orientations with respect to gravity will render them inoperative. Furthermore, while in these orientations the Kipp generator fuel system is not able to provide its automatic self regulation feature. As a result, excessive pressures will develop at the expense of wasting gas producing capacity.

In a number of applications, it would be preferable that the fuel system provide continuous operation regardless of its orientation. Such is the case for conventional dry cell batteries.

SUMMARY OF THE INVENTION

In an illustrative embodiment of the invention, apparatus for producing a gas from a chamber containing a liquid of a desired chemical composition utilizes a gravitational sensitive valve to control the access of the liquid to a member capable of liberating gas from the liquid or member. The gravitational sensitive valve allows the liquid to pass through it when the orientation of the valve, and, hence, the apparatus corresponds to a predetermined orientation range in a gravitational field. The gravitational sensitive valve takes the form of a movable gate member forming a gas to liquid seal and is freely slideable within a hollow outer tubular member so the position determined orientation of the valve in the gravitational field allows the liquid to pass through or prevents passage. The material of the movable gate member is selected to have a lower specific gravity than the liquid so the gate member utilizes buoyancy to determine its position.

In some further aspects of the invention, a plurality of gravitational sensitive valves are used in the apparatus. Each gravitational member has a uniquely different orientation so one of the plurality has an open fluid flow status when the rest of the plurality has a closed fluid flow status. In one arrangement, the plurality includes two gravitational sensitive valves having opposite directional orientations with respect to one another. In another arrangement, the plurality includes four gravitational sensitive valves and the shape of the chamber is a parallelepiped. This latter arrangement is capable of producing gas in a position of any orientation in the gravitational field.

BRIEF DESCRIPTION OF THE DRAWING

Various objects and features of the invention will become apparent after reading the following detailed description in conjunction with the drawing wherein.

DETAILED DESCRIPTION

Figure 1:
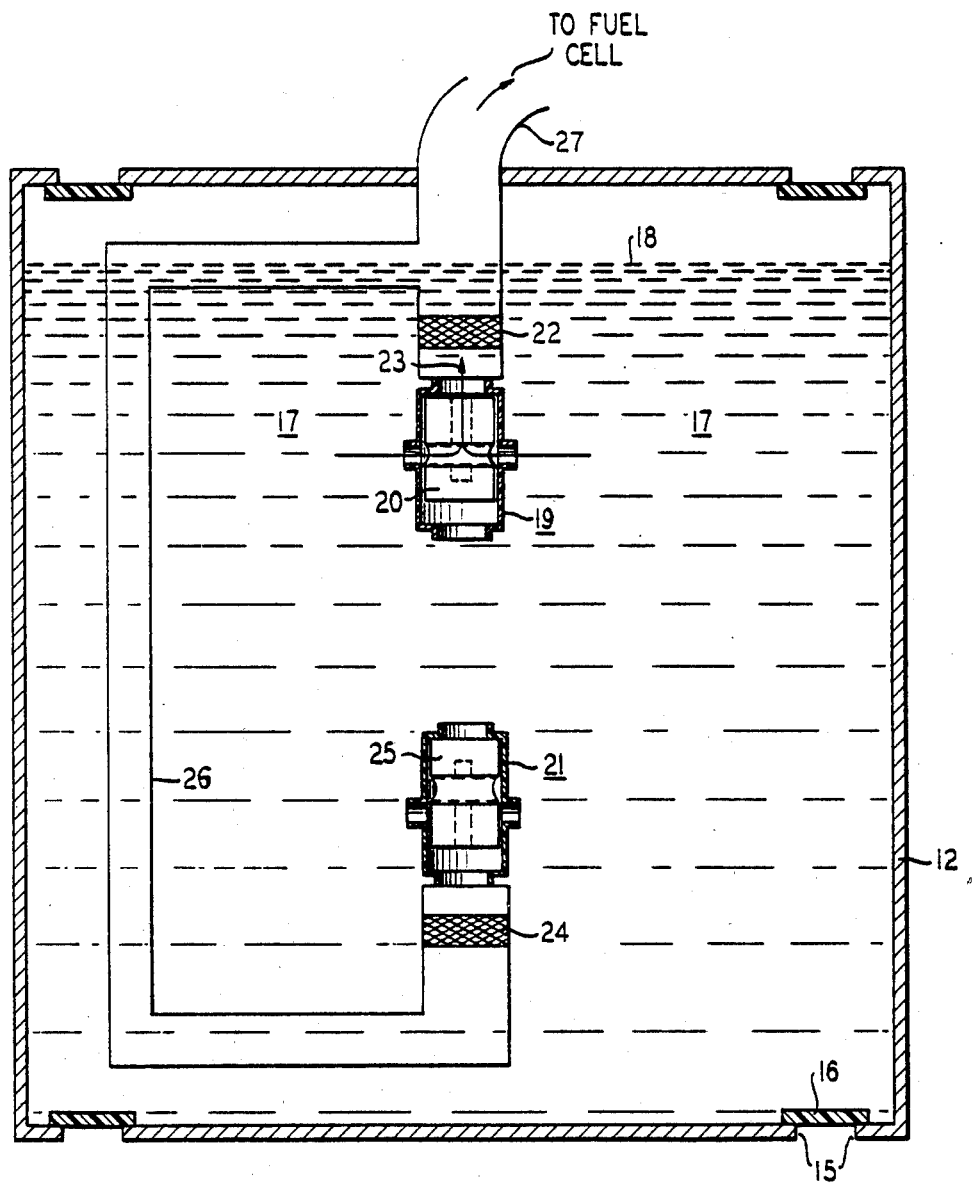
FIG. 1 is an embodiment utilizing a pair of oppositely oriented gravitational sensitive valves in a Kipp generator.

FIG. 1 illustrates a Kipp generator employing the inventive principle. The generator is shown in cross sectional form to illustrate the internal components in operational position. The generator includes outer casing 12 having a plurality of apertures, such as aperture 15 covered by Teflon hydrophobic film member 16. A suitable liquid solution 17 containing the gas to be produced, in solution or composition, by the generator occupies the chamber of case 12 below surface line 18. For that matter, the liquid may not contain the desired gas. In which case the reactive member would contain the gas to be liberated. Film member 16 permits gas to pass through it but not the liquid thereby providing venting to prevent excessive gas pressure buildup.

Of paramount importance in FIG. 1 are directional valve assemblies 19 and 21 connected together by tube 26. In the orientation of FIG. 1 with gravitational forces attracting components downward, valve assembly 19 is open for operation while valve assembly 21 is closed to prevent operation. Both gate members 20 and 25 are actually buoyed up by liquid 17. Operation involves allowing liquid 17 to come into contact with catalytic member 22 via the path indicated by arrow 23, which acts to liberate gas from the liquid to supply a fuel cell or any other equipment utilizing gas delivered by tube 27. Conversely, valve assembly 21 is closed and does not permit liquid 17 to come into contact with catalytic member 24.

It should be pointed out that without the presence of valve assembly 21, liquid 17 would continuously come into contact with catalytic member 24 producing a growing quantity of gas. In addition to increasing gas pressure substantially, there is a waste of generator capacity and failure to provide the self regulation advantage discussed previously. This is the case of any one of the conventional Kipp generators when they are placed in an orientation which allows continuous contact between the liquid and the catalytic or reactive member.

Figure 2:
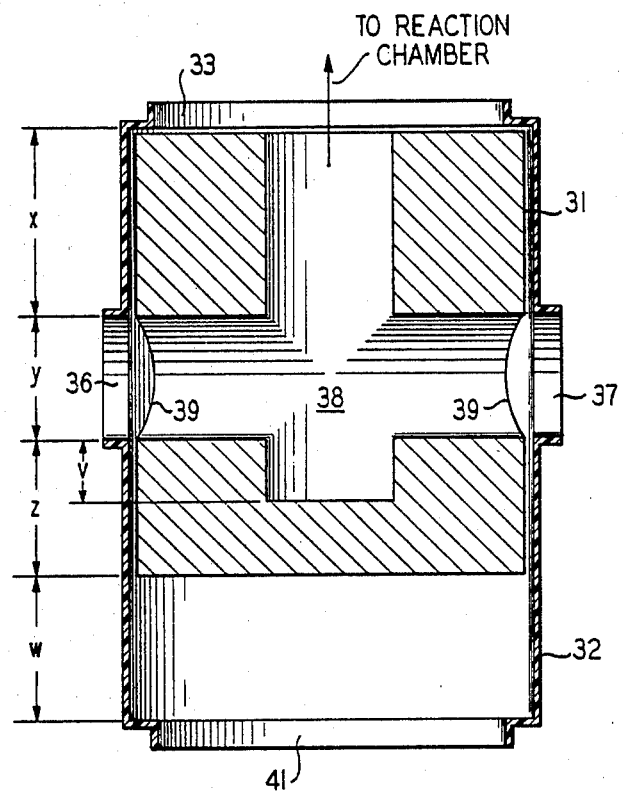
FIG. 2 illustrates the internal construction of a gravitational sensitive valve.

FIG. 2 illustrates the valve assembly in cross sectional form whose operation is sensitive to gravitational orientation. The buoyancy of movable gate member 31, which is made to freely slide within outer tube 32, and provide a gas-liquid seal determines its position and the fluid flow status of the valve. In other words, gate member 31 is buoyed upwardly in the presence of liquid entering into outer tube 32. In the position shown in FIG. 2, gate member 31 moves to rest against port 33 and opens the valve assembly. The liquid is now able to pass through either of ports 36 and 37 to enter internal passage 38 which runs laterally and vertically in gate member 31. In this position passage 38 extends a passageway through to port 33. Groove 39 runs circumferentially around gate member 31 to ensure access of the liquid to enter ports 36 and 37 to passage 38 regardless of the axial orientation of gate member 31 within outer tube 32.

When the orientation of FIG. 2 is upside down from that shown, gate member 31 moves to rest against port 41. The change in position of gate member 31 blocks off the opening of ports 36 and 37 to passage 38 and closes the valve assembly.

In order to provide the desired buoyancy of gate member 31 and to provide closure of openings 36 and 37 a number of dimensional relationships should be observed. These dimensions are designated V through Z in FIG. 2. The dimension of X is greater than Y, X is greater than W, and W is greater than Y. The dimension of V is equal to one-half of Y. The dimension of Z is greater than one-half of Y.

Figure 3:
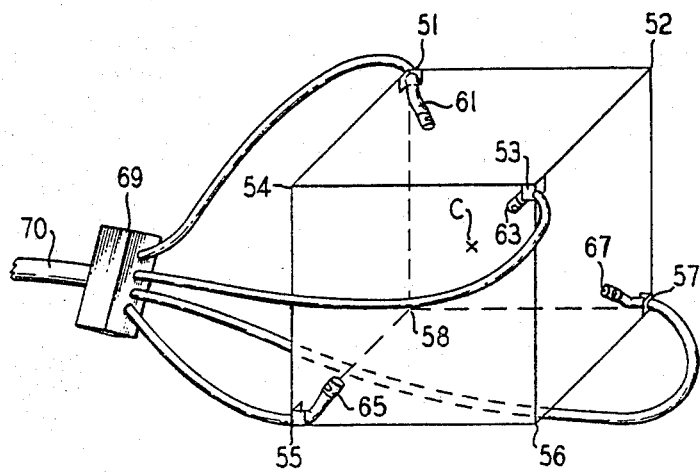
FIG. 3 is an embodiment of the invention featuring an arrangement of gravitational sensitive valves capable of providing desirable operation regardless of orientation of the generator in a gravitational field.

FIG. 3 is an extension of the inventive principles to a Kipp generator capable of suitably operating in any orientation. The limitation of arrangement of FIG. 1 is that neither of valve assemblies 19 and 21 will move to an open or closed position when gravitational forces are acting in a direction perpendicular to the vertical sides of container 12. FIG. 3 includes a container whose general shape classification is a parallelepiped with corners 51–54 on its upper surface and corners 55–58 on its lower surface. The container of FIG. 3 encloses a liquid capable of providing the desired gas for the generator.

The location of the point with the letter C corresponds to the geometric center of the parallelepiped. Each of valve assemblies 61, 63, 65 and 67 located respectively in corners 51, 53, 55, and 57 is oriented to point toward the location of point C from their respective corner. The valve assemblies of FIG. 3 are essentially the same construction as the valve assembly in FIG. 2. This geometrical configuration insures that one of valve assemblies 61, 63, 65 and 67 is properly oriented to work regardless of the orientation of the generator of FIG. 3 in a gravitational field. Accordingly, the working valve assembly allows the enclosed liquid to contact its catalytic, or reactive member, not shown, to liberate gas. This gas is delivered to manifold 69 and thus to outlet tube 70.

A number of suitable substances may be used for the liquid in the gas generators described. Of course, the choice of a particular liquid has a bearing on the choice of the type of catalytic or reactive member for liberating the appropriate gas. For example, hydrogen peroxide and platinum is one combination of choice available to those in the art for supplying oxygen. Also, water may be used as the liquid in combination with an appropriate solid fuel, e.g., $NaAlH_4$.

Other useful combinations use a liquid acid (hydrochloric or sulfuric) and a solid reactant, such as ferrous sulfide, for hydrogen sulfide gas, or marble chips for carbon dioxide gas or hydrogen gas by consuming zinc metal.

It should be noted by observation of FIGS. 1 and 3 that the location of the tubing coupling the valve assemblies together may be either internal or external to the enclosure of the generator. Furthermore, certain applications of the gas generator may require the enclosures be different shapes than those shown. For example, the generator may be integrally constructed as part of the fuel cell package. Also the geometry of the valve assembly may be varied without departing from the inventive principles. For that matter, the valve assembly may be constructed to use the force of the gravitational field directly instead of utilizing the buoyancy principle as shown. Thus, the moving internal gate component of the valve assembly, in this case, would have a density greater than the specific gravity of the liquid used. In all cases it is to be understood that the described embodiments are illustrative and that numerous and varied other arrangements may become apparent to those working in the art without departing from the invention as defined in the appended claims.

I claim:

1. Apparatus for producing a gas comprising:
   a storage chamber;
   a first liquid chemical means contained in said storage chamber for aiding in the production of a desired gas;
   valve means operatively connected to said storage chamber including means sensitive to the orientation of said valve with respect to the gravitational field in which it is placed for allowing said first liquid chemical means to pass through said valve means only when said gravitational sensing means indicates a desired range of orientation with respect to said gravitational field;
   a reaction chamber connected to said valve means at the outflow end thereof; and,
   a second chemical means contained in said reaction chamber for reacting with said first chemical means to produce said desired gas.

2. Apparatus according to claim 1 wherein said gravitational sensitive valve means comprises a hollow outer tubular member provided with fluid flow ports and comprising a fluid passage and a movable gate member means slidingly fitted in said tubular member and provided with limited movement therein for passing fluid only when said orientation is within said desired range.

3. Apparatus according to claim 2 wherein the material of the movable gate member has a lower specific gravity than the liquid and thereby is buoyant.

4. Apparatus according to claim 2 wherein a plurality of gravitational sensitive valve means are used in said apparatus each having a uniquely different orientation so that one gravitational sensitive valve is open for a specific gravitational orientation while the rest of the plurality is closed.

5. Apparatus according to claim 4 wherein said plurality comprises two gravitational sensitive valve means having opposite directional orientations with respect to one another.

6. Apparatus according to claim 4 wherein said plurality comprises four gravitational sensitive valve means and said chamber is a parallelepiped having a geometrical center and one each of two oppositely disposed surfaces of the parallelepiped has a gravitational sensitive valve means located in diagonally opposite corners of the surface so that an imaginary line connecting the valve means extend from their corner toward the geometrical center to insure that one valve means is open for appropriate operations regardless of the orientation of said parallelepiped in said gravitational field.

* * * * *